United States Patent
Wu et al.

(10) Patent No.: US 10,972,425 B2
(45) Date of Patent: Apr. 6, 2021

(54) METHOD, DEVICE AND SYSTEM FOR SERVICE PLATFORM ADDRESS RESOLUTION

(71) Applicant: Tencent Technology (Shenzhen) Company Limited, Shenzhen (CN)

(72) Inventors: Jiangqi Wu, Shenzhen (CN); Fengbo Jiang, Shenzhen (CN); Hao Hu, Shenzhen (CN); Jun Qin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 59 days.

(21) Appl. No.: 16/362,461

(22) Filed: Mar. 22, 2019

(65) Prior Publication Data

US 2019/0222553 A1    Jul. 18, 2019

Related U.S. Application Data

(63) Continuation of application No. PCT/CN2017/111142, filed on Nov. 15, 2017.

(30) Foreign Application Priority Data

Nov. 17, 2016 (CN) .......................... 201611011967.5

(51) Int. Cl.
*H04L 29/12* (2006.01)
*H04L 12/24* (2006.01)

(52) U.S. Cl.
CPC ...... *H04L 61/1511* (2013.01); *H04L 61/2007* (2013.01); *H04L 61/6095* (2013.01); *H04L 41/0806* (2013.01)

(58) Field of Classification Search
CPC ............ H04L 61/1511; H04L 61/2007; H04L 61/6095; H04L 41/0806
See application file for complete search history.

(56) References Cited

U.S. PATENT DOCUMENTS

| 7,523,193 B2 | 4/2009 | Hennungs, III |
| 2003/0055979 A1* | 3/2003 | Cooley ............... H04L 29/1282 709/227 |

FOREIGN PATENT DOCUMENTS

| CN | 104052829 A | 9/2014 |
| CN | 104125308 A | 10/2014 |

(Continued)

OTHER PUBLICATIONS

Translation of CN 106131068 A (Year: 2016).*

(Continued)

*Primary Examiner* — Joe Chacko
(74) *Attorney, Agent, or Firm* — Morgan, Lewis & Bockius LLP

(57) ABSTRACT

Embodiments of this application disclose a method for parsing a service platform address by a server. The server receives a DNS parsing request sent by a terminal, the DNS parsing request including a to-be-parsed domain name. The server then obtains target IP information of the terminal based on the DNS parsing request. When the target IP information has a corresponding target user-defined line, the server obtains a preset first parsing record based on the target user-defined line. The server then sends to the terminal a first IP address corresponding to the to-be-parsed domain name based on the preset first parsing record. As such, a corresponding IP address range can be defined using a user-defined line, so that a terminal within the IP address range can obtain a specific IP address corresponding to an access domain name, and provide a service to a user within a more accurate range.

18 Claims, 9 Drawing Sheets

(56) References Cited

FOREIGN PATENT DOCUMENTS

| CN | 104168340 A | 11/2014 |
|---|---|---|
| CN | 106131068 A | 11/2016 |

OTHER PUBLICATIONS

Translation of CN 104168340 B (Year: 2015).*
Tencent Technology, ISR, PCT/CN2017/111142, dated Feb. 7, 2018, 2 pgs.
Tencent Technology, Written Opinion , PCT/CN2017/111142, dated Feb. 7, 2018, 4 pgs.
Tencent Technology, IPRP, PCT/CN2017/111142, dated May 21, 2019, 5 pgs.

* cited by examiner

METHOD, DEVICE AND SYSTEM FOR SERVICE PLATFORM ADDRESS RESOLUTION

CROSS-REFERENCE TO RELATED APPLICATIONS

This application is a continuation application of PCT/CN2017/111142, entitled "METHOD, APPARATUS, AND SYSTEM FOR RESOLVING SERVICE PLATFORM ADDRESS" filed on Nov. 15, 2017, which claims priority to Chinese Patent Application No. 201611011967.5, entitled "METHOD AND RELATED DEVICE AND SYSTEM FOR PARSING SERVICE PLATFORM ADDRESS" filed with the Patent Office of China on Nov. 17, 2016, all of which are incorporated by reference in their entirety.

FIELD OF THE TECHNOLOGY

This application relates to the field of Internet technologies, and in particular, to a method, device, and system for parsing a service platform address.

BACKGROUND OF THE DISCLOSURE

With the development of communications technologies, the Internet has a more and more important position in daily work and life of people. A host in the Internet may be identified in a plurality of manners, for example, a uniform resource locator (English full name: Uniform Resource Locator, English abbreviation: URL) domain name, and the Internet Protocol (English full name: Internet Protocol, English abbreviation: IP). The URL domain name almost includes no position information of the host in the Internet, such as baidu.com. The IP address is corresponding to position information of the host in the Internet, such as 192.158.100.011. Because the URL domain name is easy to memorize, and the IP address is a number type name, and it is difficult to understand and memorize the IP address, people usually access a corresponding host by using a URL domain name. To access a corresponding host by using a URL domain name, a domain name system (English full name: Domain Name Service, English abbreviation: DNS) server of the Internet first needs to query an IP address corresponding to the URL domain name based on the URL domain name, and then a browser accesses the service server corresponding to the URL domain name based on the corresponding IP address.

Currently, network access lines obtained by a DNS server are divided based on operators or regions. For some websites in a designed state, some users may be first selected as grayscale users. The grayscale users can access the website prior to common users, and assist a website developer in improving the website after the access. The website does not get online until the website satisfies requirements of users. In this case, common uses can also access the website.

However, to facilitate managing and monitoring operations of the grayscale users on the website that prepares to get online, the developer needs to accurately find the grayscale users. If the users are divided based on different operators or regions, it may be difficult to position the grayscale users due to a relatively large range.

SUMMARY

Embodiments of this application provide a method and a related device and system for parsing a service platform address. A more accurate range can be positioned by using a user-defined line, so as to provide a service for a user within the range. The user-defined line is a line preset by a service developer based on requirements, thereby improving the flexibility and practicability of the solutions, and also facilitating selecting a grayscale user for service experience.

In view of this, a first aspect of the embodiments of this application provides a method for parsing a service platform address performed at a server having one or more processors and memory storing a plurality of programs to be executed by the one or more processors, the method including:

receiving, by the server, a domain name system DNS parsing request sent by a terminal, the DNS parsing request including a to-be-parsed domain name;

obtaining, by the server, target Internet protocol IP information of the terminal based on the DNS parsing request;

in accordance with a determination that the target IP information has a corresponding target user-defined line, obtaining, by the server, a preset first parsing record based on the target user-defined line, the first parsing record being used to instruct the terminal to establish a communications connection to a first target server of the to-be-parsed domain name; and sending, by the server to the terminal, a first IP address corresponding to the to-be-parsed domain name based on the preset first parsing record.

A second aspect of the embodiments of this application provides a server having one or more processors, memory and a plurality of programs stored in the memory that, when executed by the one or more processors, cause the server to perform the aforementioned method.

A third aspect of the embodiments of this application provides a non-transitory computer readable storage medium storing a plurality of instructions in connection with a server having one or more processors. The plurality of instructions, when executed by the one or more processors, cause the electronic apparatus to perform the aforementioned method.

According to the foregoing technical solutions, it can be learned that the embodiments of this application have the following advantages:

In the embodiments of this application, a method for parsing a service platform address in provided. A server first receives a DNS parsing request sent by a terminal. The DNS parsing request includes a to-be-parsed domain name. Then target IP information of the terminal is obtained based on the DNS parsing request. If the target IP information has a corresponding target user-defined line, a preset first parsing record including the target user-defined line can be obtained based on the target user-defined line. The first parsing record is used to instruct the terminal to establish a communications connection to a first target server of the to-be-parsed domain name. Finally, a first IP address corresponding to the to-be-parsed domain name is sent to the terminal based on the first parsing record preset by a user. A user-defined line is a line preset by a service developer based on requirements. A corresponding IP address range can be defined by using the user-defined line, so that a user terminal within the IP address range can obtain a specific IP address corresponding to an access domain name, to be specific, provide a service for a user within a more accurate range, thereby improving the flexibility and practicability of the solutions, and also facilitating selecting a grayscale user for service experience.

DESCRIPTION OF EMBODIMENTS

Embodiments of this application provide a method and a related device and system for parsing a service platform address. A more accurate IP address range can be positioned by using a user-defined line, so as to provide a service for a user within the IP address range. The user-defined line may be a line preset by a service developer based on requirements, thereby improving the flexibility and practicability of the solutions, and also facilitating selecting a grayscale user for service experience.

In the specification, the claims, and the foregoing accompanying drawings of the embodiments of this application, the terms "first", "second", "third", "fourth", and so on (if any) are intended to distinguish between similar objects rather than indicating a specific order. It should be understood that such used data can be exchanged with each other in appropriate cases, so that the embodiments of this application that are described herein can be implemented, for example, in a sequence other than the sequences shown in the figures or described herein. Moreover, the terms "include", "comprise", and any variants thereof are intended to cover a non-exclusive inclusion. For example, a process, method, system, product, or device that includes a list of steps or units is not necessarily limited to those steps or units that are clearly listed, but may optionally further include other steps or units not expressly listed or inherent to such a process, method, product, or device.

Figure 1:
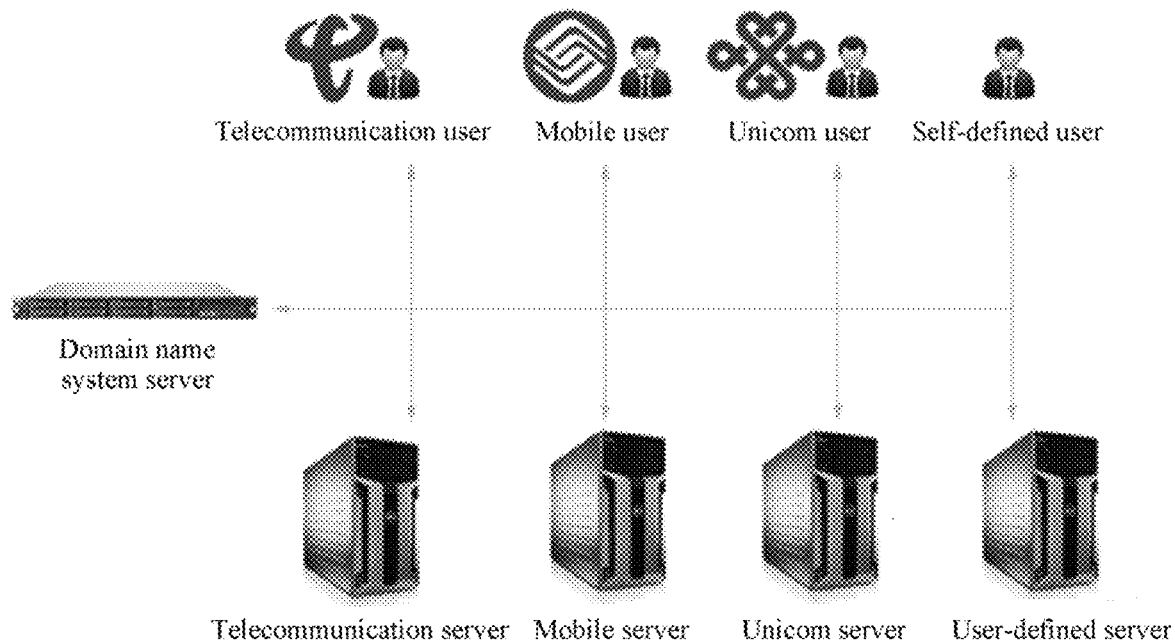
FIG. 1 is an architectural diagram of a system for parsing a service platform address according to an embodiment of this application.

It should be understood that the embodiments of this application may be applied to a system for parsing a service platform address. Referring to FIG. 1, FIG. 1 is an architectural diagram of a system for parsing a service platform address according to an embodiment of this application. As shown in FIG. 1, a DNS server not only can separately obtain corresponding IP addresses, for accessing a domain name, of corresponding lines of a telecommunication (a network operator) user, a mobile (another network operator) user, and a Unicom (another network operator) user, but also can obtain an ID address, for accessing the domain name, of a self-defined user terminal, and then a terminal of each line can access a server of the domain name corresponding to each line by using the IP address obtained by the DNS server. For a self-defined user, the user can access a specific server, and the DNS server sets a "white list" of the specific server, and adds an IP address of an accessible user into the "white list". Usually, these accessible users are grayscale users. For example, a terminal of a mobile user sends a DNS parsing request including a domain name to the DNS server, the DNS server may obtain an IP address, for accessing the domain name, of a line of the mobile user, and the terminal of the mobile user may access the domain name by using the IP address. The self-defined user can access a specific server corresponding to the domain name by using the specific IP address that is for accessing the domain name and that is obtained by the DNS server, so that some self-defined users can access the specific server of the domain name.

The DNS server may be understood as a distributed database with a mutual mapping between a domain name and an IP address, so that a user is enabled to access the Internet more conveniently without memorizing an IP string that can be directly read by a machine. A process in which the DNS server finally obtains an IP address corresponding to a host name by using the host name is referred to as domain name parsing. The DNS Protocol runs on the User Datagram Protocol (English full name: User Datagram Protocol, English abbreviation: UDP), and uses a portal number 53. In a series of requests for comments (English full name: Request For comments, English abbreviation: RFC), RFC 2181 has a specification for the DNS, RFC 2136 describes dynamic update of the DNS, and RFC 2308 describes reverse caching queried by the DNS.

Mapping from a host name to an IP address may be performed in two manners:

1) static mapping: each terminal device is equipped with mapping from a host name to an IP address; each terminal device independently maintains its own mapping table, which is used only by the terminal device; and 2) dynamic mapping: a set of domain name parsing system is established; mapping from a host name to an IP address is configured on a dedicated DNS server; a device that needs to communicate by using the host name on a network first needs to query, on the DNS server, the IP address corresponding to the host name.

A process in which the IP address corresponding to the host name is finally obtained by using the host name is referred to as domain name parsing (or host name parsing). During domain name parsing, a static domain name parsing method may be first used. If static domain name parsing fails, a dynamic domain name parsing method is used. Some common domain names may be placed in a static domain name parsing table, to greatly improve the domain name parsing efficiency.

Figure 2:
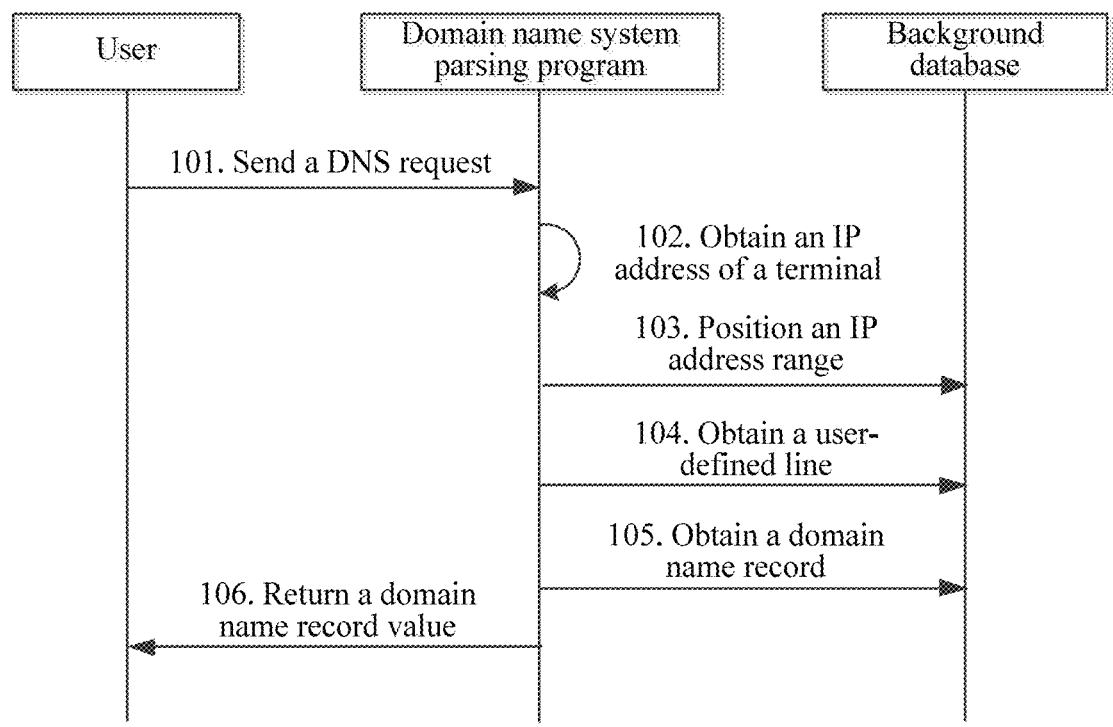
FIG. 2 is a schematic diagram of an interactive embodiment of a method for parsing a service platform address according to an embodiment of this application.

For ease of understanding, referring to FIG. 2, FIG. 2 is a schematic diagram of an interactive embodiment of a method for parsing a service platform address according to an embodiment of this application, as shown in FIG. 2, specifically:

In step 101, a user sends a DNS parsing request to a DNS server by using a terminal, where the DNS parsing request includes a to-be-parsed domain name, and the DNS parsing request is used to instruct a DNS parsing program in the DNS server to start to parse a domain name. In addition, one DNS parsing request belongs to only one domain name.

In step 102, the DNS parsing program obtains an IP address of the terminal, where the IP address of the terminal may be a DNS IP address of the terminal, and the DNS IP address may be understood as an IP address allocated by a network operator to the terminal. The IP address of the terminal may also be an actual IP address of the terminal.

In step 103, the DNS parsing program positions to a particular IP address range based on the IP address of the terminal and the to-be-parsed domain name. Specifically, the DNS parsing program stores user-defined line information in a background database for each domain name. The user-defined line information is corresponding to one or more IP address ranges. User-defined line information of the to-be-parsed domain name can be obtained based on the to-be-parsed domain name. The IP address of the terminal may be further searched in one or more IP address ranges corresponding to the user-defined line information, and the IP address of the terminal is positioned to a particular IP address range corresponding to the user-defined line information.

In step 104, the DNS parsing program can determine a unique self-defined line identifier based on a self-defined line positioned in the IP address range.

Each self-defined line identifier has a unique identifier. When a particular IP address range is positioned based on the IP address of the terminal and the to-be-parsed domain name, a self-defined line identifier to which the IP address range belongs may also be learned.

In step 105, then the DNS parsing program obtains, based on the self-defined line identifier, a domain name record set by a user. The domain name record includes a correspondence between a domain name and an IP address for accessing the domain name.

Specifically, the DNS parsing program searches domain name record setting based on the self-defined line identifier. If domain name parsing of a user-defined line can be found, it indicates that the domain name parsing of the user-defined line is set, and otherwise, if the domain name parsing of the user-defined line is not found, processing is performed based on a common line, to be specific, an identifier of the common line is positioned, and then whether the user has sets domain name parsing of the common line is further searched.

In step 106, the DNS parsing program returns a set domain name record value to the terminal based on a search result. The domain name record value may be understood as an IP address for accessing the to-be-parsed domain name. The IP address for accessing the to-be-parsed domain name may be understood as an IP address of a server corresponding to the to-be-parsed domain name.

For example, if the to-be-parsed domain name is a domain name 1, there is a user-defined line 1 for the domain name 1, and there is a domain name record having the domain name 1 and an IP address 1 for accessing the domain name 1, the IP address 1 may be fed back to the terminal, so that the terminal accesses the domain name 1 by using the IP address 1.

Figure 3:
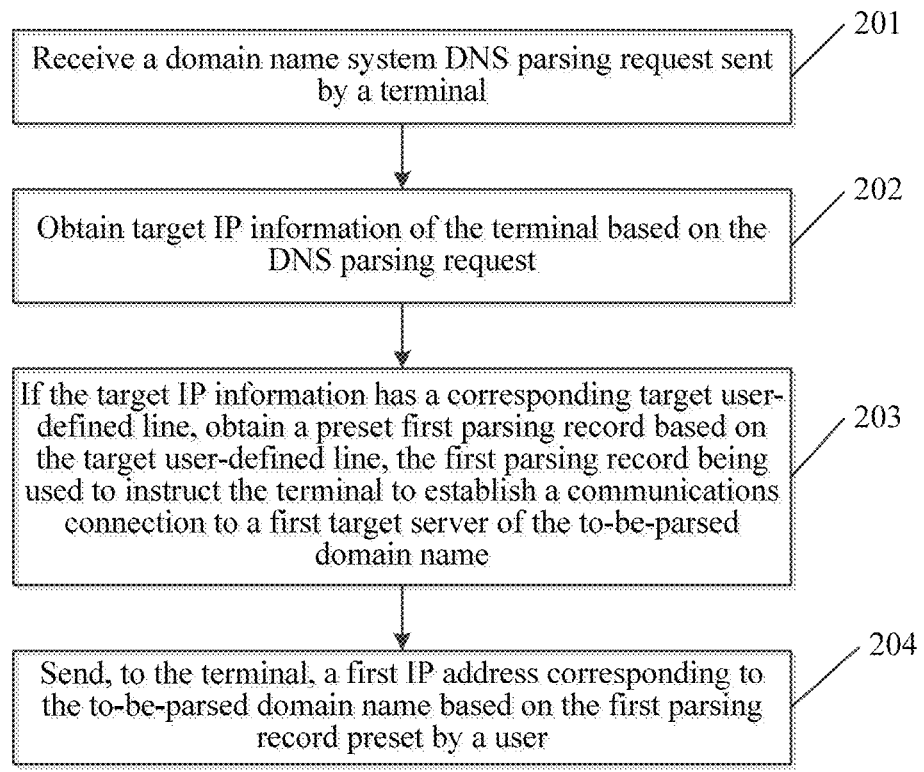
FIG. 3 is a schematic diagram of an embodiment of a method for parsing a service platform address according to an embodiment of this application.

The following describes a method for parsing a service platform address in this application from the perspective of a server. Referring to FIG. 3, an embodiment of the method for parsing a service platform address according to an embodiment of this application includes:

201: Receive a domain name system DNS parsing request sent by a terminal, the DNS parsing request including a to-be-parsed domain name.

In this embodiment, a DNS server receives the DNS parsing request sent by the terminal. The DNS parsing request carries a domain name requested by a user by using the terminal, and one DNS parsing request is corresponding to one domain name. The domain name is the to-be-parsed domain name. A domain name is a name that is of a computer or a computer group on a network and that consists of a string of names spaced by dots, and is used for identifying an electronic bearing of a computer during data transmission, and sometimes refers to a geographical location, and a geographical domain name refers to a regional area having administrative autonomy. The domain name is a "mask" on an IP address. The objective of the domain name is to facilitate memory and communication of a group of addresses of servers.

202: Obtain target IP information of the terminal based on the DNS parsing request.

In this embodiment, the DNS server obtains the target IP information corresponding to the terminal based on the DNS parsing request. The target IP information includes an IP address, and may also include information about an IP address range in which the IP address is located.

203: If the target IP information has a corresponding target user-defined line, obtain a preset first parsing record based on the target user-defined line, the first parsing record being used to instruct the terminal to establish a communications connection to a first target server of the to-be-parsed domain name.

In this embodiment, the DNS server determines, based on the target IP information, whether a background database stores the target user-defined line corresponding to the target IP information. If yes, the DNS server obtains the preset first parsing record based on the user-defined line.

The first parsing record may be used to instruct the terminal used by a user to establish a communications connection to a first target server of the to-be-parsed domain name. The first target server may provide a service for a user specified by the to-be-parsed domain name. In addition, the first parsing record may include at least one of a record identifier, a record name, a record value, and a user-defined line identifier that are preset by the user.

The record identifier is a domain name, for example, "www.aabbcc.com". The record name is a host name, for example, "admin". The record value is an IP address, for example, "8.8.8.8". The user-defined line identifier is a unique identifier randomly allocated by the DNS or set by the user, for distinguishing between different user-defined lines.

The first parsing record including the identifier may be determined based on the user-defined line identifier, and a record value corresponding to the to-be-parsed domain name is obtained from the first parsing record. The record value is a first IP address of the first target server for accessing the to-be-parsed domain name.

204: Send, to the terminal, a first IP address corresponding to the to-be-parsed domain name based on the first parsing record preset by a user.

In this embodiment, after obtaining the first parsing record from the background database, the DNS server may send the record value, namely, the first IP address corresponding to the to-be-parsed domain name, in the first parsing record to the terminal, so that the terminal establishes the communications connection to the first target server of the to-be-parsed domain name by using the first IP address, and the terminal can obtain a corresponding server from the target server.

In this embodiment of this application, a method for parsing a service platform address in provided. A server first receives a DNS parsing request sent by a terminal. The DNS parsing request includes a to-be-parsed domain name. Then target IP information of the terminal is obtained based on the DNS parsing request. If the target IP information has a corresponding target user-defined line, a preset first parsing record including the target user-defined line can be obtained based on the target user-defined line. The first parsing record is used to instruct the terminal to establish a communications connection to a first target server of the to-be-parsed domain name. Finally, a first IP address corresponding to the to-be-parsed domain name is sent to the terminal based on the first parsing record preset by a user. A user-defined line is a line preset by a service developer based on requirements. A corresponding IP address range can be defined by using the user-defined line, so that a user terminal within the IP address range can obtain a specific IP address corresponding to an access domain name, to be specific, provide a service for a user within a more accurate range, thereby improving the flexibility and practicability of the solutions, and also facilitating selecting a grayscale user for service experience.

Based on the embodiment corresponding to FIG. 3, in an optional embodiment of a method for parsing a service platform address according to an embodiment of this application, after obtaining the target Internet Protocol IP information of the terminal based on the DNS parsing request, the method may further include:

determining the target user-defined line corresponding to the target IP information based on a correspondence between an IP address range and a user-defined line and that is stored in a background database.

In this embodiment, after obtaining the target IP information of the terminal based on the DNS parsing request, the DNS server may search, in a background database in the DNS server, for the correspondence between the IP address range and the user-defined line. The correspondence is preset by a user. For example, a "user-defined line 5" of the to-be-parsed domain name includes an IP address range 4.4.4.4 to 4.4.4.255. When the IP address in the target IP information is 4.4.4.16, it can be determined that the target IP information is corresponding to the "user-defined line 5" of the to-be-parsed domain name.

In this embodiment of this application, it is described that the DNS server may also determine the target user-defined line corresponding to the target IP information based on a correspondence between an IP address range and a user-defined line and that is stored in a background database. In the foregoing manner, it is convenient for the DNS server to search for the target user-defined line associated with the target IP information, thereby improving the reliability of the solution. A correspondence is searched in the background database, to ensure the practicability of the solution.

In some possible implementations of this application, specific implementation of determining the target user-defined line associated with and corresponding to the target IP information based on a correspondence between an IP information address range and a user-defined line and that is stored in a background database may include:

searching, based on the correspondence between an IP address range and a user-defined line, in an IP address range corresponding to a user-defined line of the to-be-parsed domain name, for the target IP information; and determining a user-defined line whose IP address range includes the to-be-parsed domain name of the target IP information as the target user-defined line corresponding to the target IP information.

Sending, to the terminal, a first IP address corresponding to the to-be-parsed domain name based on the preset first parsing record includes:

obtaining a first IP address corresponding to the to-be-parsed domain name from a preset first parsing record, and sending, to the terminal, the first IP address corresponding to the to-be-parsed domain name.

Figure 4:
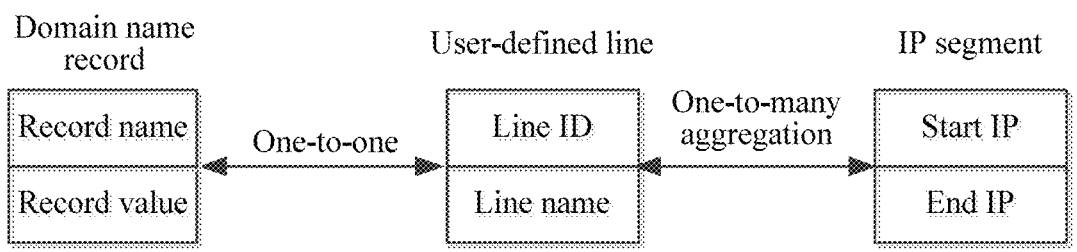
FIG. 4 is a static schematic structural diagram of a parsing record according to an embodiment of this application.

Referring to FIG. 4, FIG. 4 is a static schematic structural diagram of a parsing record according to an embodiment of this application. The parsing record may be a first parsing record. As shown in FIG. 4, the first parsing record may include a domain name record, namely, a record name of the domain name and a record value of the domain name. The record name of the domain name may be a record identifier or a host name. The record identifier may be a domain name, for example, "www.aabbcc.com". The host name, for example, is "admin". The record value of the domain name is an IP address, for example, "8.8.8.8".

One domain name record may be corresponding to one user-defined line. The first parsing record may further include a user-defined line. The user-defined line includes a user-defined line identifier and a user-defined line name. The user-defined line identifier is unique, and the user-defined line name may be set based on requirements.

However, one user-defined line may be corresponding to a plurality of IP address ranges, namely, a plurality of IP segments. Each address range needs to include one start IP address and one end IP address, to constitute a suitable range. The IP address range may be "2.2.2.2 to 2.2.2.2", namely, an IP address range consisting of only one IP address, or may be "4.4.4.4 to 4.4.4.255", namely, an IP address range consisting of a plurality of IP addresses. However, the foregoing is merely an example, and should not be understood a limitation to this solution.

Based on the DNS parsing request, the DNS server may determine that the to-be-parsed domain name is needed, to obtain a user-define line of the to-be-parsed domain name, and then search, in an IP address range corresponding to the user-defined line of the to-be-parsed domain name, for the target IP information based on a plurality of IP address ranges corresponding to the user-defined line. If the DNS server determines that the target IP address of the terminal exists in the IP address range corresponding to the user-defined line of the to-be-parsed domain name, the user-defined line is determined as the target user-defined line corresponding to the target IP information. A first IP address of the first target server of the to-be-parsed domain name may be searched in the first parsing record corresponding to the target user-defined line in the background database, and the first IP address is sent to the terminal.

In this embodiment of this application, a method for determining the first IP address by the DNS server is described. In the foregoing manner, the DNS is enabled to provide a corresponding IP address to the terminal by using a user-defined line preset by the user, so that a specific user can access a specific server of the to-be-accessed domain name, thereby improving the practicability and feasibility of the solution.

Based on the foregoing embodiment, in another optional embodiment of a method for parsing a service platform address according to an embodiment of this application, the method may further include:

receiving a user-defined line adding request, where the user-defined line adding request carries a to-be-added parsing record; and storing the to-be-added parsing record in the user-defined line adding request into the background database.

In this embodiment, the DNS server may further receive a user-defined line adding request sent by at least one terminal, and updates information in a background database by using the user-defined line adding request.

Specifically, the user sends the user-defined line adding request to the DNS server by using the terminal. The user-defined line adding request carries a series of to-be-added parsing records, such as at least one of a record identifier, a record name, a record value, and a user-defined line identifier. The DNS server may parse the user-defined line adding request, to obtain a to-be-added parsing record set by the user, and then stores the to-be-added parsing record into the background database of the DNS server.

It may be understood that IP address ranges of a plurality of user-defined lines added for a same domain name cannot have an intersection set. When the user-defined lines are added, the DNS server performs checking, to ensure that for a same domain name, an IP address of a terminal accessing the domain name can be corresponding to only one IP address range, thereby positioning a unique user-defined line.

In this embodiment of this application, the DNS may further receive the user-defined line adding request in real time. The user-defined line adding request carries the to-be-added parsing record, so that the DNS server can store the to-be-added parsing record in the user-defined line adding request into the background database based on the user-defined line adding request. In the foregoing manner, the background database of the DNS server can be updated in real time based on requirements, and a range of a terminal accessing the target server is accurate to a specific range, thereby enhancing the operability of the solution.

Based on the foregoing embodiment, in an optional embodiment of a method for parsing a service platform address according to an embodiment of this application, after obtaining the target IP information of the terminal based on the DNS parsing request, the method may further include:

if the target IP information does not have the corresponding target user-defined line, searching for a second parsing record corresponding to the target IP information based on a preset priority, where the second parsing record is used to instruct the terminal to establish a communications connection to a second target server of the to-be-parsed domain name; and sending, to the terminal, a second IP address corresponding to the to-be-parsed domain name based on the second parsing record.

In this embodiment, if the DNS server determines, by searching for a correspondence between an IP address range and a user-defined line in a background database, that the target IP information does not have the corresponding target user-defined line, the DNS server searches for a second parsing record corresponding to the target IP based on a preset priority. The second parsing record is used to instruct the terminal to establish a communications connection to a second target server of the to-be-parsed domain name.

Specifically, a priority of a user-defined line in a DNS server is highest by default. For example, when the target IP information is corresponding to a "user-defined line 5", "Shenzhen (a city name of China) telecommunication line", "Guangdong (a province name of China) telecommunication line", and "China telecommunication line" of the to-be-parsed domain name, the DNS server preferentially establishes a communications connection from the terminal to the target server of the to-be-parsed domain name by using the "user-defined line 5". If the target IP information does not have the corresponding user-defined line, the DNS establishes, based on a preset priority, a communications connection from the terminal to another target server of the to-be-parsed domain name by using the "Shenzhen telecommunication line". By such analogy, it is obtained that a preset priority order is a user-defined line, a city operation line, a province operation line, and a national operation line.

The DNS server searches for a line used by the target IP information, and determines a second parsing record corresponding to the line. The second parsing record also includes at least one of a preset record identifier, record name, record value, and user-defined line identifier. Similarly, based on the second parsing record, the DNS server sends a record value corresponding to the to-be-parsed domain name to the terminal. The record name is a second IP address of a second target server for accessing the to-be-parsed domain name, so that the terminal establishes, by using the second IP address, a communications connection to a target server providing a service, and obtains a corresponding service.

In this embodiment of this application, if the target IP information does not have the corresponding target user-defined line, the DNS server searches for a second paring record corresponding to the target IP information based on a preset priority, and then sends a second IP address to the terminal based on the second parsing record. In the foregoing manner, the DNS server may also send the second IP address to a terminal corresponding to a non-user-defined line, to ensure that the DNS can send a corresponding IP address to the terminal based on a priority order thereby improving the practicability and the operability of the solution.

Figure 5:
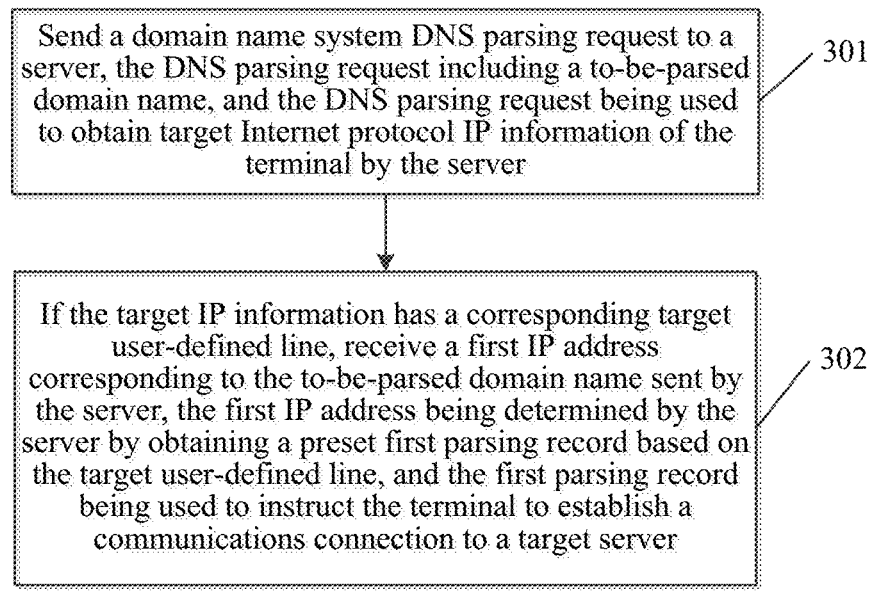
FIG. 5 is a schematic diagram of another embodiment of a method for parsing a service platform address according to an embodiment of this application.

The foregoing embodiment describes, from the perspective of the server, the method for parsing a service platform address in this application. A method for parsing a service platform address in this application is described below from the perspective of a terminal. Referring to FIG. 5, an embodiment of the method for parsing a service platform address according to an embodiment of this application includes:

301: Send a domain name system DNS parsing request to a server, the DNS parsing request including a to-be-parsed domain name, and the DNS parsing request being used to obtain target Internet protocol IP information of the terminal by the server.

In this embodiment, first, the terminal sends the DNS parsing request to the DNS server. The DNS parsing request carries a domain name requested by the user by using the terminal, and one DNS parsing request is corresponding to one domain name. The domain name is the to-be-parsed domain name. After receiving the request, the DNS server obtains the target IP information corresponding to the terminal based on the DNS parsing request. The target IP information includes an IP address of the terminal, and may also include information about an IP address range in which the IP address is located.

302: If the target IP information has a corresponding target user-defined line, receive a first IP address corresponding to the to-be-parsed domain name sent by the server, the first IP address being determined by the server by obtaining a preset first parsing record based on the target user-defined line, and the first parsing record being used to instruct the terminal to establish a communications connection to a target server.

In this embodiment, the DNS server determines, based on the target IP information, whether a background database stores the target user-defined line corresponding to the target IP information. If yes, the DNS server obtains the preset first parsing record based on the user-defined line, and sends a first IP address in the first parsing record to the terminal. The first parsing record is used to instruct the terminal used by a user to establish a communications connection to a first target server of the to-be-parsed domain name. The first target server may provide a service for a user specified by the to-be-parsed domain name. In addition, the first parsing record may include at least one of a record identifier, a record name, a record value, and a user-defined line identifier that are preset by the user.

For an implementation process in which the server sends the first IP address in the first parsing record to the terminal, refer to the foregoing embodiment, and details are not described herein again.

The terminal may establish a communications connection to the first target server of the to-be-parsed domain name by using the first IP address, and may obtain a corresponding service from the target server.

In this embodiment of this application, a method for parsing a service platform address is provided. A terminal sends a DNS parsing request to a server. The DNS parsing request includes a to-be-parsed domain name, and the DNS parsing request is used to obtain target Internet Protocol IP information of the terminal by the server. If the target IP information has a corresponding target user-defined line, a first IP address corresponding to the to-be-parsed domain name sent by the server is received. The first IP address is determined by the server by obtaining a preset first parsing record based on the target user-defined line, and the first parsing record is used to instruct the terminal to establish a communications connection to a target server. In the foregoing manner, a corresponding IP address range can be defined by using the user-defined line, so that a user terminal within the IP address range can obtain a specific IP address corresponding to an access domain name, to be specific, provide a service for a user within a more accurate range, thereby improving the flexibility and practicability of the solutions, and also facilitating selecting a grayscale user for service experience.

Based on the foregoing embodiment, in an optional embodiment of a method for parsing a service platform address according to an embodiment of this application, the method may further include:

receiving a user-defined line adding request, where the user-defined line adding request carries a to-be-added parsing record; and sending the user-defined line adding request to the server, so that the server stores the to-be-added parsing record into a background database.

In this embodiment, the terminal may receive the user-defined line adding request sent by the user. The user-defined line adding request carries the to-be-added parsing record, for example, at least one of a record identifier, a record name, a record value, and a user-defined line identifier. The DNS server parses the request based on the user-defined line adding request, and then stores the to-be-added parsing record into the background database.

Figure 6:
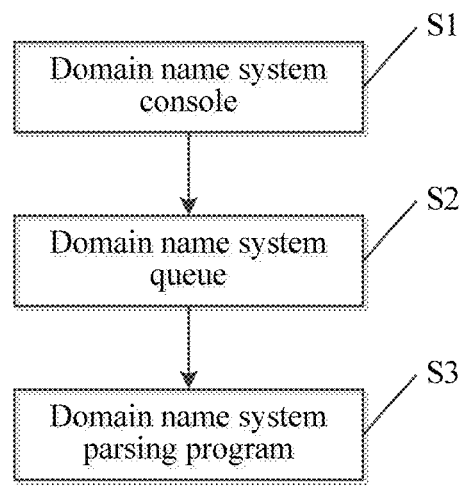
FIG. 6 is an interactive schematic flowchart of adding a user-defined line according to an embodiment of this application.

Referring to FIG. 6, FIG. 6 is an interactive schematic flowchart of adding a user-defined line according to an embodiment of this application. As shown in FIG. 6, a user logs in to a DNS client corresponding to a DNS server on a terminal, adds a user-defined line by using the DNS client, and sets an IP address range corresponding to the user-defined line. A console S1 in the DNS server writes the user-defined line into a DNS queue S2. The DNS queue S2 is a special linear table, and is special in that it allows only a deletion operation on a front end of the table, and an insertion operation on a back end of the table, just like a stack. The DNS queue S2 is a linear table with limited operation. An end on which an insertion operation is performed is referred to as a queue tail, and an end on which a deletion operation is performed in referred to as a queue head.

The DNS queue S2 includes information about a user-defined line, for example, a user-defined line identifier, a priority of the user-defined line, and an IP address range. The priority of the user-defined line is highest, and secondly, a descending priority order may be a city operator, a province operator, and a national operator. It should be noted that this is merely an example, and should be not be understood as a limitation to this application.

A DNS parsing program S3 pulls the DNS queue S2 periodically, and updates it to a local cache, to support the user-defined line.

It may be understood that IP address ranges of a plurality of user-defined lines added for a same domain name cannot have an intersection set. When the user-defined lines are added, the DNS server performs checking, to ensure that for a same domain name, an IP address of a terminal accessing the domain name can be corresponding to only one IP address range, thereby positioning a unique user-defined line.

In this embodiment of this application, the terminal first receives the user-defined line adding request sent by the user. The user-defined line adding request carries the to-be-added parsing record, and then the user-defined line adding request is sent to the server, so that the server stores the to-be-added parsing record into the background database. In the foregoing manner, the background database of the DNS server can be updated in real time based on requirements, and a range of a terminal accessing the target server is accurate to a specific range, thereby enhancing the operability of the solution.

Based on the foregoing embodiment, in another optional embodiment of a method for parsing a service platform address according to an embodiment of this application, after sending the domain name system DNS parsing request to the server, the method may further include:

if the target IP information does not have the corresponding target user-defined line, receiving a second IP address corresponding to the to-be-parsed domain name sent by the server, where the second IP address is determined by the server after searching for a second parsing record corresponding to the IP information based on a preset priority, and the second parsing record is used to instruct the terminal to establish a communications connection to a second target server of the to-be-parsed domain name.

In this embodiment, if the DNS server determines, by searching for a correspondence between an IP address range and a user-defined line in a background database, that the target IP information does not have the corresponding target user-defined line, the DNS server searches for a second parsing record corresponding to the target IP based on a preset priority.

Specifically, a priority of a user-defined line in a DNS server is highest by default. For example, when the target IP information is corresponding to a "user-defined line 5", "Shenzhen telecommunication line", "Guangdong telecommunication line", and "China telecommunication line" of the to-be-parsed domain name, the DNS server preferentially establishes a communications connection from the terminal to the target server of the to-be-parsed domain name by using the "user-defined line 5". If the target IP information does not have the corresponding user-defined line, the DNS establishes, based on a preset priority, a communications connection from the terminal to another target server of the to-be-parsed domain name by using the "Shenzhen telecommunication line". By such analogy, it is obtained that a preset priority order is a user-defined line, a city operation line, a province operation line, and a national operation line.

The DNS server searches for a line used by the target IP information, and determines a second parsing record corresponding to the line. The second parsing record also includes at least one of a preset record identifier, record name, record value, and user-defined line identifier. Similarly, based on the second parsing record, the DNS server sends a record value corresponding to the to-be-parsed domain name to the terminal. The record name is a second IP address of a second target server for accessing the to-be-parsed domain name, so that the terminal establishes, by using the second IP address, a communications connection to a target server providing a service, and obtains a corresponding service.

In this embodiment of this application, if the DNS server detects that the target IP information does not have the corresponding target user-defined line, the terminal receives the second IP address sent by the DNS server, and the second IP address is determined by the server after searching for the second parsing record corresponding to the target IP information based on a preset priority. In the foregoing manner, the DNS server may also send the second IP address to a terminal corresponding to a non-user-defined line, to ensure that the DNS can send a corresponding IP address to the terminal based on a priority order thereby improving the practicability and the operability of the solution.

For ease of understanding, a process of parsing a service platform address in this application may be described in detail below by using a specific application scenario, specifically:

A company A is an Internet company that has just started its career. Currently, the company is devoted in developing a website for communication between designers. However, before the website officially gets online, the company A selects a designer of a particular level in the company as a grayscale user for test. This website needs to be improved based on use experience of the grayscale user, thereby achieving a better use effect.

Figure 7:
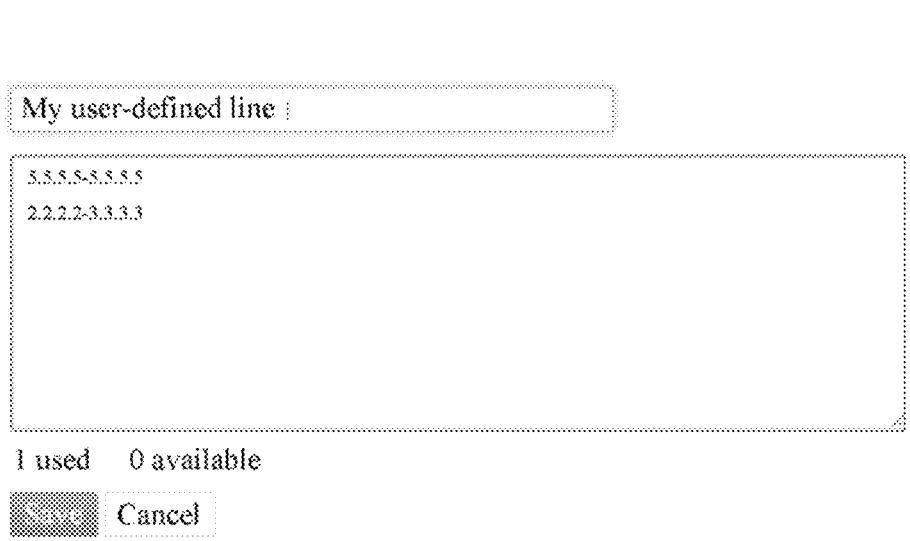
FIG. 7 is a schematic diagram of an interface of adding a user-defined line in an application scenario.

A website developer first logs in to a DNSPod website, and a user-define line that can be used by a layer of designers of the company A can be self-defined by using the DNSPod website. Specifically, FIG. 7 is a schematic diagram of an interface of adding a user-defined line in an application scenario. The website developer adds an IP address of a terminal used by the grayscale user to "my user-defined lines", for example, the IP address range may be "5.5.5.5 to 5.5.5.5" or "2.2.2.2 to 3.3.3.3". Then a terminal whose IP address is in the two ranges can establish a communications connection to a new web site developed by the website developer.

In addition, the website developer may further add or delete an IP address range from "my user-defined lines" corresponding to FIG. 7, thereby adjusting a range of the grayscale user.

In "my user-defined lines", the website developer may further add a user-defined line identifier based on requirements. The identifier is unique, and not only may be added by a user, but also may be allocated by the DNS server. In addition, a record value, namely, an IP address may also be added. The IP address is an address of a server providing a new website service. In addition, a record name, namely, a domain name may also be added. For example, a domain name of the new website is "www.abcdefg.com". The experience of using the new website by the grayscale user is used for the network developer to update or adjust a corresponding function.

The user may send the DNS parsing request to the DNS server by using the terminal. For example, the to-be-parsed domain name in the DNS parsing request is "www.abcdefg.com". In addition, the DNS server may determine an IP address of the terminal. If the IP address of the terminal is within the IP address range "5.5.5.5 to 5.5.5.5" and the IP address range "2.2.2.2 to 3.3.3.3", it can be determined that the user-defined line is a target user-defined line of the to-be-parsed domain name. Further, a record value in parsing information corresponding to the user-defined line can be obtained. The record value is a server IP address of the domain name "www.abcdefg.com". Therefore, the grayscale user may access, based on the IP address, the server that provides the new website service.

Figure 8:
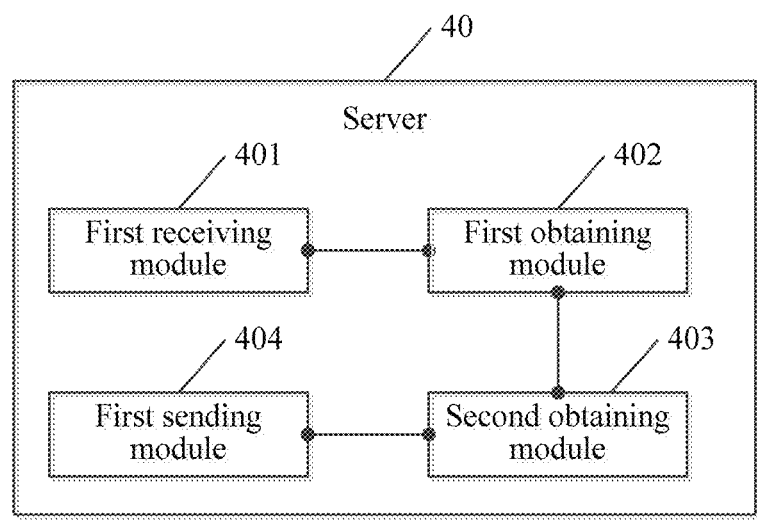
FIG. 8 is a schematic diagram of an embodiment of a server according to an embodiment of this application.

The server in this application is described in detail below. Referring to FIG. 8, the server in the embodiments of this application is a server in a system for parsing a service platform address. The server includes:

a first receiving module 401, configured to receive a domain name system DNS parsing request sent by a terminal, the DNS parsing request including a to-be-parsed domain name;

a first obtaining module 402, configured to obtain target Internet protocol IP information of the terminal based on the DNS parsing request received by the first receiving module 401;

a second obtaining module 403, configured to: if the target IP information obtained by the first obtaining module has a corresponding target user-defined line, obtain a preset first parsing record based on the target user-defined line, the first parsing record being used to instruct the terminal to establish a communications connection to a first target server of the to-be-parsed domain name; and a first sending module 404, configured to send, to the terminal, a first IP address corresponding to the to-be-parsed domain name based on the preset first parsing record obtained by the second obtaining module.

In this embodiment, a first receiving module 401 receives a domain name system DNS parsing request sent by a terminal, the DNS parsing request including a to-be-parsed domain name; a first obtaining module 402 obtains target Internet Protocol IP information of the terminal based on the DNS parsing request received by the first receiving module 401; if the target IP information obtained by the first obtaining module 402 has a corresponding target user-defined line, a second obtaining module 403 obtains a preset first parsing record based on the target user-defined line, the first parsing record being used to instruct the terminal to establishes a communications connection to a first target server of the to-be-parsed domain name, and a first sending module 404 sends, to the terminal, a first IP address corresponding to the to-be-parsed domain name based on the preset first parsing record obtained by the second obtaining module 403.

In this embodiment of this application, a server for parsing a service platform address in provided. The server first receives a DNS parsing request sent by a terminal. The DNS parsing request includes a to-be-parsed domain name. Then target IP information of the terminal is obtained based on the DNS parsing request. If the target IP information has a corresponding target user-defined line, a preset first parsing record including the target user-defined line can be obtained based on the target user-defined line. The first parsing record is used to instruct the terminal to establish a communications connection to a first target server of the to-be-parsed domain name. Finally, a first IP address corresponding to the to-be-parsed domain name is sent to the terminal based on the first parsing record preset by a user. A user-defined line is a line preset by a service developer based on requirements. A corresponding IP address range can be defined by using the user-defined line, so that a user terminal within the IP address range can obtain a specific IP address corresponding to an access domain name, to be specific, provide a service for a user within a more accurate range, thereby improving the flexibility and practicability of the solutions, and also facilitating selecting a grayscale user for service experience.

Figure 9:
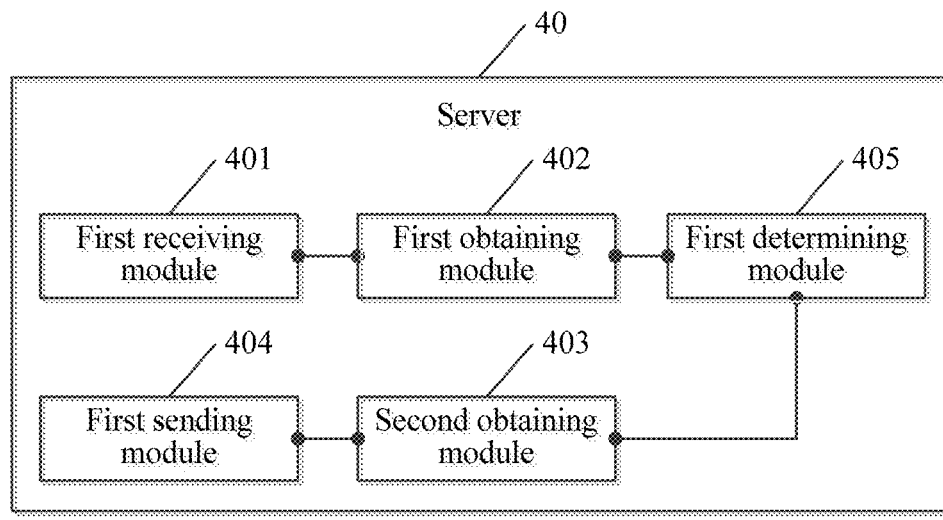
FIG. 9 is a schematic diagram of another embodiment of a server according to an embodiment of this application.

Based on the foregoing embodiment, referring to FIG. 9, in another embodiment of the server provided in the embodiments of this application, the server 40 further includes:

a determining module 405, configured to determine the target user-defined line corresponding to the target IP information based on a correspondence between an IP address range and a user-defined line and that is stored in a background database after the first obtaining module 402 obtains the target IP information of the terminal based on the DNS parsing request.

In this embodiment of this application, it is described that the DNS server may also determine the target user-defined line corresponding to the target IP information based on a correspondence between an IP address range and a user-defined line and that is stored in a background database. In the foregoing manner, it is convenient for the DNS server to search for the target user-defined line associated with the target IP information, thereby improving the reliability of the solution. A correspondence is searched in the background database, to ensure the practicability of the solution.

Figure 10:
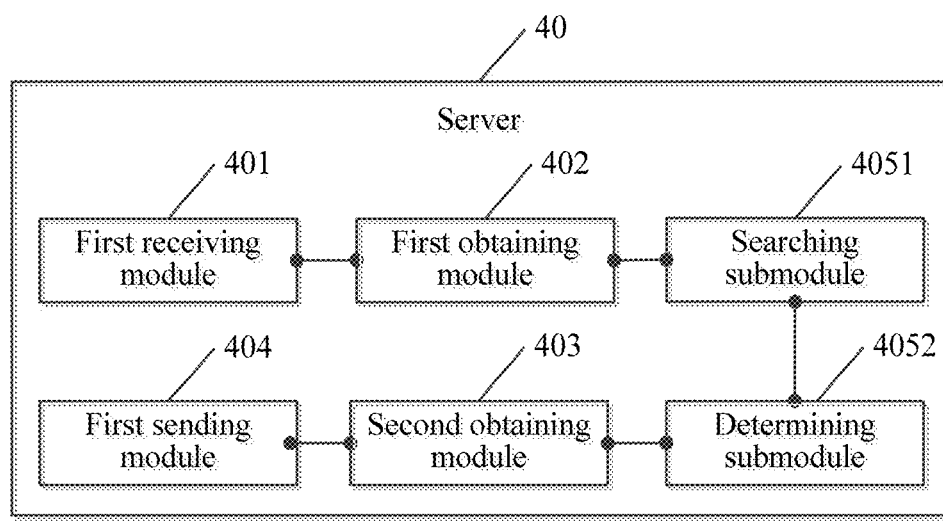
FIG. 10 is a schematic diagram of another embodiment of a server according to an embodiment of this application.

Based on the foregoing embodiment, referring to FIG. 10, in another embodiment of the server provided in the embodiments of this application, the determining module may include:

a searching submodule 4051, configured to search, based on the correspondence between an IP address range and a user-defined line, in an IP address range corresponding to a user-defined line of the to-be-parsed domain name, for the target IP information; and a determining submodule 4052, configured to determine a user-defined line whose IP address range includes the to-be-parsed domain name of the target IP information as the target user-defined line corresponding to the target IP information based on a search result of the searching submodule.

The first sending module may include:

an obtaining submodule (not shown in the figure), configured to obtain the first IP address corresponding to the to-be-parsed domain name from the preset first parsing record; and a sending submodule (not shown in the figure), configured to send, to the terminal, the first IP address corresponding to the to-be-parsed domain name obtained by the obtaining submodule.

In this embodiment of this application, a method for determining the first IP address by the DNS server is described. In the foregoing manner, the DNS is enabled to provide a corresponding IP address to the terminal by using a user-defined line preset by the user, so that a specific user can access a specific server of the to-be-accessed domain name, thereby improving the practicability and feasibility of the solution.

Figure 11:
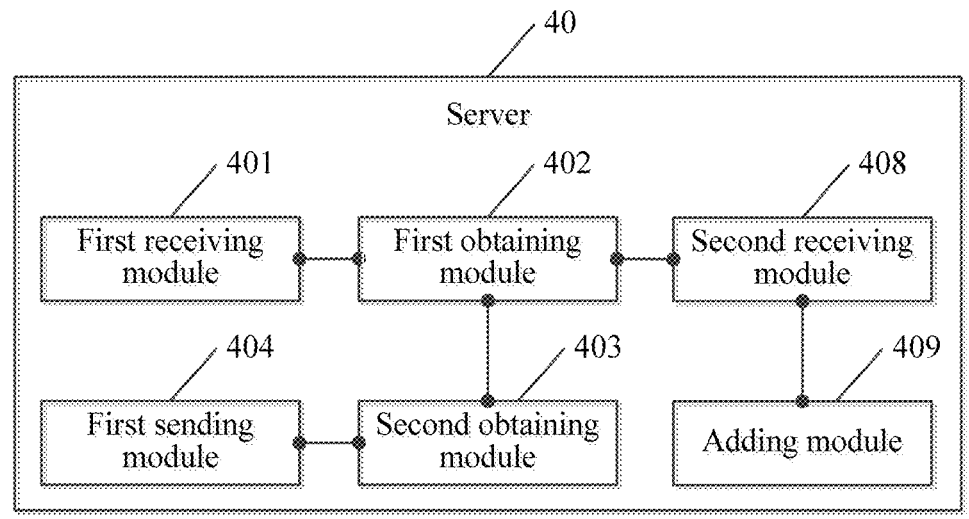
FIG. 11 is a schematic diagram of another embodiment of a server according to an embodiment of this application.

Based on the foregoing embodiment, referring to FIG. 11, in another embodiment of the server provided in the embodiments of this application, the server 40 further includes:

a second receiving module 408, configured to receive a user-defined line adding request, where the user-defined line adding request carries a to-be-added parsing record; and an adding module 409, configured to store the to-be-added parsing record in the user-defined line adding request received by the second receiving module into the background database.

In this embodiment of this application, the DNS may further receive the user-defined line adding request in real time. The user-defined line adding request carries the to-be-added parsing record, so that the DNS server can store the to-be-added parsing record in the user-defined line adding request into the background database based on the user-defined line adding request. In the foregoing manner, the background database of the DNS server can be updated in real time based on requirements, and a range of a terminal accessing the target server is accurate to a specific range, thereby enhancing the operability of the solution.

Figure 12:
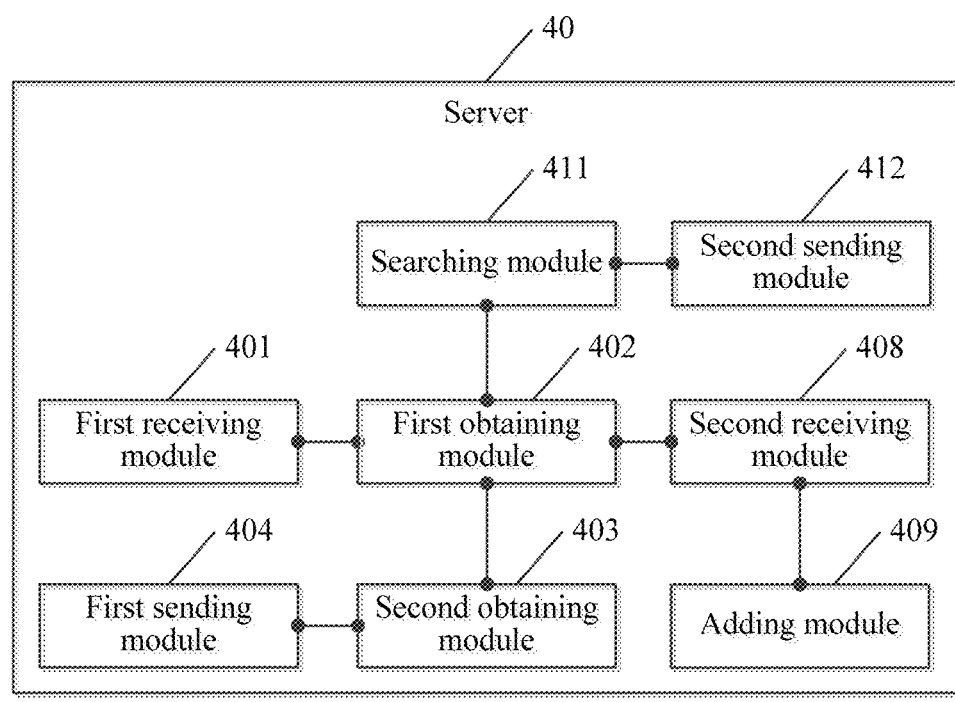
FIG. 12 is a schematic diagram of another embodiment of a server according to an embodiment of this application.

Based on the foregoing embodiment, referring to FIG. 12, in another embodiment of the server provided in the embodiments of this application, the server 40 further includes:

a searching module 411, configured to search for a second parsing record corresponding to the target IP information based on a preset priority if the target IP information does not have the corresponding target user-defined line after the first obtaining module 402 obtains the target IP information of the terminal based on the DNS parsing request, where the second parsing record is used to instruct the terminal to establish a communications connection to a second target server of the to-be-parsed domain name; and a second sending module 412, configured to send, to the terminal, a second IP address corresponding to the to-be-parsed domain name based on the second parsing record found by the searching module 411.

In this embodiment of this application, if the target IP information does not have the corresponding target user-defined line, the DNS server searches for a second paring record corresponding to the target IP information based on a preset priority, and then sends a second IP address to the terminal based on the second parsing record. In the foregoing manner, the DNS server may also send the second IP address to a terminal corresponding to a non-user-defined line, to ensure that the DNS can send a corresponding IP address to the terminal based on a priority order thereby improving the practicability and the operability of the solution.

Figure 13:
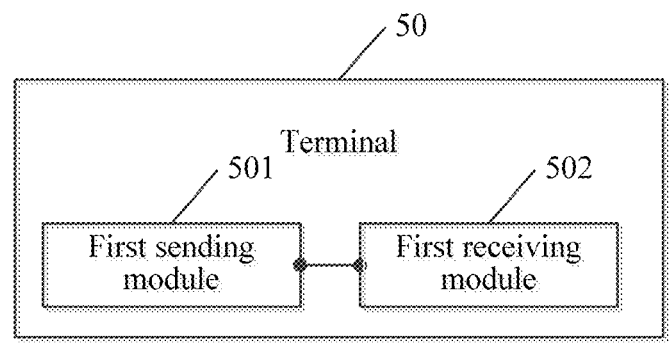
FIG. 13 is a schematic diagram of an embodiment of a terminal according to an embodiment of this application.

The server in this application is described above, and the following describes the terminal in this application in detail. Referring to FIG. 13, the terminal in the embodiments of this application is a terminal in a system for parsing a service platform address, and the terminal includes:

a first sending module 501, configured to send a domain name system DNS parsing request to a server, the DNS parsing request including a to-be-parsed domain name, and the DNS parsing request being used to obtain target Internet protocol IP information of the terminal by the server; and a first receiving module 502, configured to: if the target IP information has a corresponding target user-defined line, receive a first IP address corresponding to the to-be-parsed domain name sent by the server, the first IP address being determined by the server by obtaining a preset first parsing record based on the target user-defined line, and the first parsing record being used to instruct the terminal to establish a communications connection to a target server.

In this embodiment, a first sending module 501 sends a domain name system DNS parsing request to a server, where the DNS parsing request includes a to-be-parsed domain name, and is used to obtain target Internet Protocol IP information of the terminal by the server. If the target IP information has a corresponding target user-defined line, a first receiving module 502 receives a first IP address corresponding to the to-be-parsed domain name sent by the server. The first IP address is determined by the server by obtaining a preset first parsing record based on the target user-defined line. The first parsing record is used to instruct the terminal to establish a communications connection to the target server.

In this embodiment of this application, a terminal for parsing a service platform address is provided. A terminal sends a DNS parsing request to a server. The DNS parsing request includes a to-be-parsed domain name, and the DNS parsing request is used to obtain target Internet Protocol IP information of the terminal by the server. If the target IP information has a corresponding target user-defined line, a first IP address corresponding to the to-be-parsed domain name sent by the server is received. The first IP address is determined by the server by obtaining a preset first parsing record based on the target user-defined line, and the first parsing record is used to instruct the terminal to establish a communications connection to a target server. In the foregoing manner, a corresponding IP address range can be defined by using the user-defined line, so that a user terminal within the IP address range can obtain a specific IP address corresponding to an access domain name, to be specific, provide a service for a user within a more accurate range, thereby improving the flexibility and practicability of the solutions, and also facilitating selecting a grayscale user for service experience.

Figure 14:
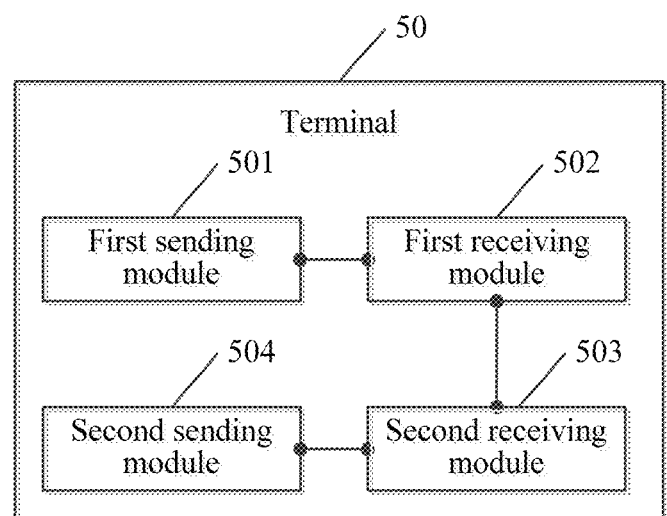
FIG. 14 is a schematic diagram of another embodiment of a terminal according to an embodiment of this application.

Based on the foregoing embodiment, referring to FIG. 14, in another embodiment of the server provided in the embodiments of this application, the terminal 50 further includes:

a second receiving module 503, configured to receive a user-defined line adding request, where the user-defined line adding request carries a to-be-added parsing record; and a second sending module 504, configured to send the user-defined line adding request received by the second receiving module 503 to the server, so that the server stores the to-be-added parsing record into a background database.

In this embodiment of this application, the terminal first receives the user-defined line adding request sent by the user. The user-defined line adding request carries the to-be-added parsing record, and then the user-defined line adding request is sent to the server, so that the server stores the to-be-added parsing record into the background database. In the foregoing manner, the background database of the DNS server can be updated in real time based on requirements, and a range of a terminal accessing the target server is accurate to a specific range, thereby enhancing the operability of the solution.

Figure 15:
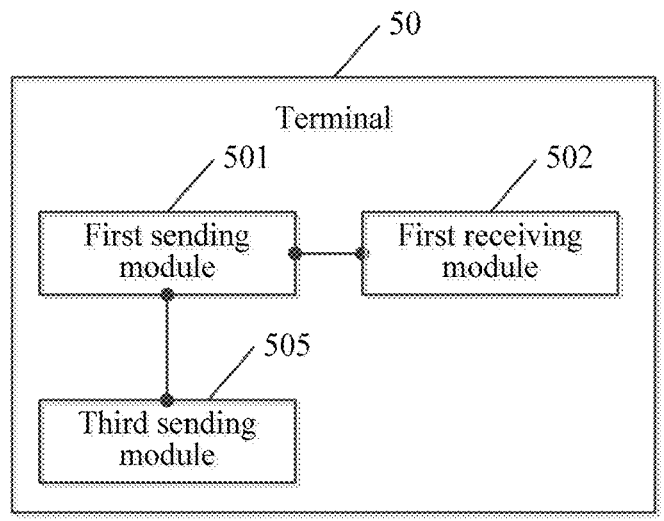
FIG. 15 is a schematic diagram of another embodiment of a terminal according to an embodiment of this application.

Based on the foregoing embodiment, referring to FIG. 15, in another embodiment of the server provided in the embodiments of this application, the terminal 50 further includes:

a third sending module 505, configured to receive a second IP address corresponding to the to-be-parsed domain name sent by the server if the target IP information does not have the corresponding target user-defined line after the first sending module sends the domain name system DNS parsing request to the server, where the second IP address is determined by the server after searching for a second parsing record corresponding to the target IP information based on a preset priority, and the second parsing record is used to instruct the terminal to establish a communications connection to a second target server of the to-be-parsed domain name.

In this embodiment of this application, if the DNS server detects that the target IP information does not have the corresponding target user-defined line, the terminal receives the second IP address sent by the DNS server, and the second IP address is determined by the server after searching for the second parsing record corresponding to the target IP information based on a preset priority. In the foregoing manner, the DNS server may also send the second IP address to a terminal corresponding to a non-user-defined line, to ensure that the DNS can send a corresponding IP address to the terminal based on a priority order thereby improving the practicability and the operability of the solution.

Figure 16:
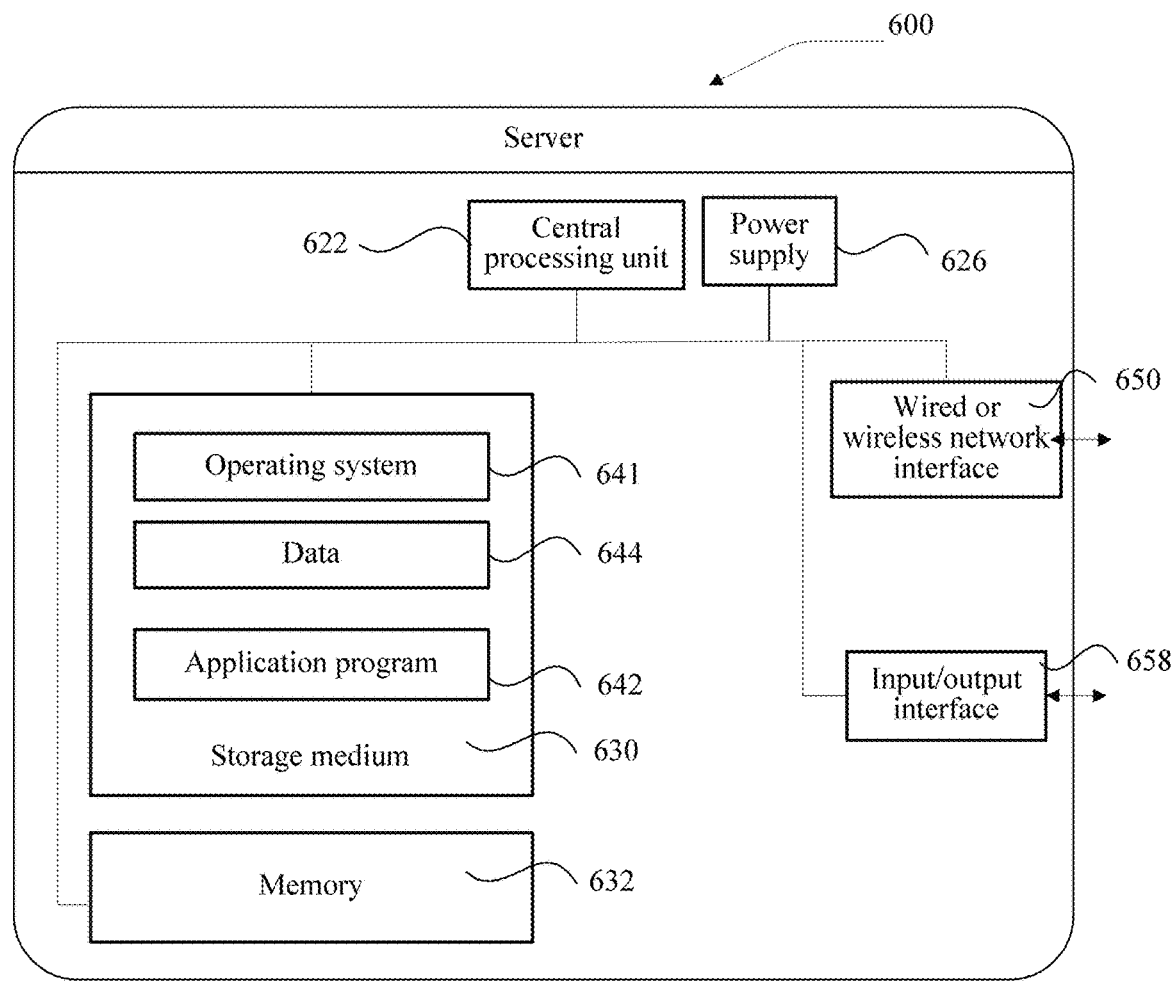
FIG. 16 is a schematic structural diagram of a server according to an embodiment of this application.

FIG. 16 is a schematic structural diagram of a server according to an embodiment of this application. The server 600 may vary greatly due to different configurations or performance, and may include one or more central processing units (English full name: central processing units, English abbreviation: CPU) 622 (for example, one or more processors), a memory 632, and one or more storage media 630 (for example, one or more mass storage devices) that store an application program 642 or data 644. The memory 632 and the storage medium 630 may be transient or persistent storages. The program stored in the storage medium 630 may include one or more modules (not shown in the figure), and each module may include a series of instructions and operations for the server. Further, the central processing unit 622 may be configured to communicate with the storage medium 630, and perform, on the server 600, a series of instructions and operations in the storage medium 630.

The server 600 may further include one or more power supplies 626, one or more wired or wireless network interfaces 650, one or more input/output interfaces 658, and/or one or more operating systems 641, for example, Windows Server, Mac OS X™, Unix™, Linux™, or FreeBSD™.

In the foregoing embodiment, steps executed by the server may be based on the server structure shown in FIG. 16.

The central processing unit 622 is configured to:

receive a domain name system DNS parsing request sent by a terminal, the DNS parsing request including a to-be-parsed domain name;

obtaining target Internet protocol IP information of the terminal based on the DNS parsing request;

if the target IP information has a corresponding target user-defined line, obtain a preset first parsing record based on the target user-defined line, the first parsing record being used to instruct the terminal to establish a communications connection to a first target server of the to-be-parsed domain name; and send, to the terminal, a first IP address corresponding to the to-be-parsed domain name based on the preset first parsing record.

Correspondingly, after the obtaining target IP information of the terminal based on the DNS parsing request, the method further includes:

determining the target user-defined line corresponding to the target IP information based on a correspondence between an IP address range and a user-defined line and that is stored in a background database.

Correspondingly, determining the target user-defined line that is of the to-be-parsed domain name and that is corresponding to the target IP information includes:

searching, based on the correspondence between an IP address range and a user-defined line, in an IP address range corresponding to a user-defined line of the to-be-parsed domain name, for the target IP information; and determining a user-defined line whose IP address range includes the to-be-parsed domain name of the target IP information as the target user-defined line corresponding to the target IP information.

Correspondingly, sending, to the terminal, a first IP address corresponding to the to-be-parsed domain name based on the preset first parsing record includes:

obtaining the first IP address corresponding to the to-be-parsed domain name from the preset first parsing record; and sending, to the terminal, the first IP address corresponding to the to-be-parsed domain name.

Correspondingly, the method further includes:

receiving a user-defined line adding request, where the user-defined line adding request carries a to-be-added parsing record; and storing the to-be-added parsing record in the user-defined line adding request into the background database.

Correspondingly, after the obtaining target IP information of the terminal based on the DNS parsing request, the method further includes:

if the target IP information does not have the corresponding target user-defined line, searching for a second parsing record corresponding to the target IP information based on a preset priority, where the second parsing record is used to instruct the terminal to establish a communications connection to a second target server of the to-be-parsed domain name; and sending, to the terminal, a second IP address corresponding to the to-be-parsed domain name based on the second parsing record.

Figure 17:
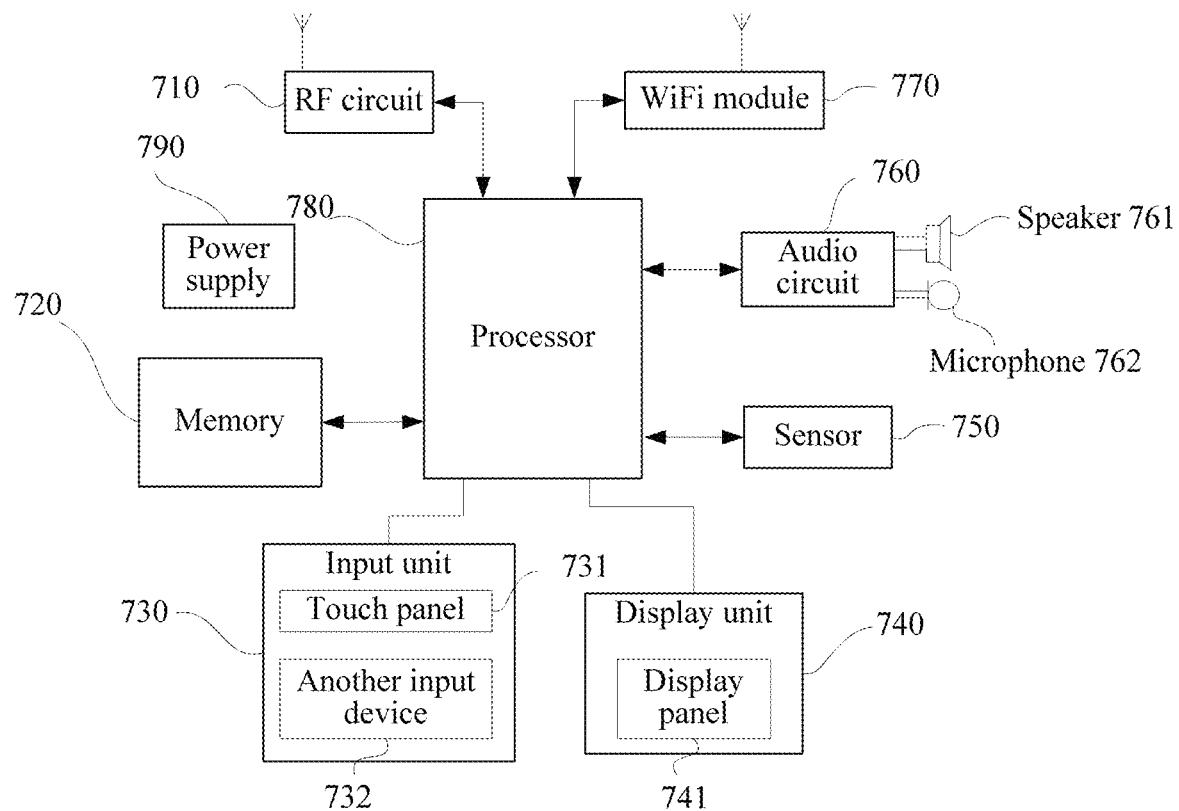
FIG. 17 is a schematic structural diagram of a terminal according to an embodiment of this application.

An embodiment of this application further provides a terminal. As shown in FIG. 17, for ease of description, only parts related to the embodiments of this application are shown. For specific technical details that are not disclosed, refer to the method part of the embodiments of this application. The terminal may be any terminal device such as a wearable camera, a tablet computer, a personal digital assistant (English full name: Personal Digital Assistant, English abbreviation: PDA), a point of sales (English full name: Point of Sales, English abbreviation: POS), or an in-vehicle computer. For example, the terminal is a mobile phone.

FIG. 17 is a block diagram of a structure of a part of a mobile phone related to a terminal according to an embodiment of this application. Referring to FIG. 17, the mobile phone includes components such as a radio frequency (English full name: Radio Frequency, English abbreviation: RF) circuit 710, a memory 720, an input unit 730, a display unit 740, a sensor 750, an audio circuit 760, a wireless fidelity (English full name: wireless fidelity, English abbreviation: Wi-Fi) module 770, a processor 780, and a power supply 790. A person skilled in the art may understand that the structure shown in FIG. 17 does not constitute a limitation to the mobile phone, and the mobile phone may include more components or fewer components than those shown in the figure, or some components may be combined, or a different component deployment may be used.

The following specifically describes the components of the mobile phone with reference to FIG. 17.

The RF circuit 710 may be configured to receive and send a signal during an information receiving and sending process or a call process. Specifically, the RF circuit 710 receives downlink information from a base station, then delivers the downlink information to the processor 780 for processing, and sends related uplink data to the base station. Usually, the RF circuit 710 includes, but is not limited to, an antenna, at least one amplifier, a transceiver, a coupler, a low noise amplifier (English full name: Low Noise Amplifier, English abbreviation: LNA), and a duplexer. In addition, the RF circuit 710 may also communicate with a network and another device by wireless communication. The wireless communication may use any communications standard or protocol, which includes, but is not limited to, Global System for Mobile communications (English full name: Global System of Mobile communication, English abbreviation: GSM), General Packet Radio Service (English full name: General Packet Radio Service, English abbreviation: GPRS), Code Division Multiple Access (English full name: Code Division Multiple Access, English abbreviation: CDMA), Wideband Code Division Multiple Access (English full name: Wideband Code Division Multiple Access, English abbreviation: WCDMA), Long Term Evolution (English full name: Long Term Evolution, English abbreviation: LTE), email, Short Messaging Service (English full name: Short Messaging Service, English abbreviation: SMS), and the like.

The memory 720 may be configured to store a software program and module. The processor 780 runs the software program and module stored in the memory 720, to implement various functional applications and data processing of the mobile phone. The memory 720 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 720 may include a high speed random access memory, and may further include a non-volatile memory, such as at least one magnetic disk storage device, a flash memory, or other volatile solid-state storage devices.

The input unit 730 may be configured to receive input digit or character information, and generate a keyboard signal input related to the user setting and function control of the mobile phone. Specifically, the input unit 730 may include a touch panel 731 and another input device 732. The touch panel 731 may also be referred to as a touchscreen, and may collect a touch operation of a user on or near the touch panel (such as an operation of a user on or near the touch panel 731 by using any suitable object or attachment, such as a finger or a touch pen), and drive a corresponding connection apparatus according to a preset program. The touch panel 731 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 780. Moreover, the touch controller can receive and execute a command sent from the processor 780. In addition, the touch panel 731 may be a resistive, capacitive, infrared, or surface sound wave type touch panel. In addition to the touch panel 731, the input unit 730 may further include the another input device 732. Specifically, the another input device 732 may include, but is not limited to, one or more of a physical keyboard, a functional key (such as a volume control key or a switch key), a track ball, a mouse, and a joystick.

The display unit 740 may be configured to display information input by the user or information provided for the user, and various menus of the mobile phone. The display unit 740 may include a display panel 741. The display panel 741 may be configured in a form such as a liquid crystal display (English full name: Liquid Crystal Display, English abbreviation: LCD), or an organic light-emitting diode (English full name: Organic Light-Emitting Diode, English abbreviation: OLED). Further, the touch panel 731 may cover the display panel 741. After detecting a touch operation on or near the touch panel 731, the touch panel 731 transfers the touch operation to the processor 780, so as to determine a type of a touch event. Then, the processor 780 provides corresponding visual output on the display panel 741 according to the type of the touch event. Although, in FIG. 7, the touch panel 731 and the display panel 741 are used as two separate parts to implement input and output functions of the mobile phone, in some embodiments, the touch panel 731 and the display panel 741 may be integrated to implement the input and output functions of the mobile phone.

The mobile phone may further include at least one sensor 750 such as an optical sensor, a motion sensor, and other sensors. Specifically, the optical sensor may include an ambient light sensor and a proximity sensor. The ambient light sensor may adjust luminance of the display panel 741 according to brightness of the ambient light. The proximity sensor may switch off the display panel 741 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 760, a speaker 761, and a microphone 762 may provide audio interfaces between the user and the mobile phone. The audio circuit 760 may convert received audio data into an electric signal and transmit the electric signal to the speaker 761. The speaker 761 converts the electric signal into a sound signal for output. On the other hand, the microphone 762 converts a collected sound signal into an electric signal. The audio circuit 760 receives the electric signal and converts the electric signal into audio data, and outputs the audio data to the processor 780 for processing. Then, the processor 780 sends the audio data to, for example, another mobile phone by using the RF circuit 710, or outputs the audio data to the memory 720 for further processing.

WiFi is a short distance wireless transmission technology. The mobile phone may help, by using the WiFi module 770, the user to receive and send emails, browse a web page, access streaming media, and so on, which provides wireless broadband Internet access for the user. Although FIG. 17 shows the WiFi module 770, it may be understood that the WiFi module 770 is not a necessary component of the mobile phone, and when required, the WiFi module 770 may be omitted as long as the scope of the essence of the present disclosure is not changed.

The processor 780 is the control center of the mobile phone, and is connected to various parts of the mobile phone by using various interfaces and lines. By running or executing the software program and/or module stored in the memory 720, and invoking data stored in the memory 720, the processor 780 performs various functions and data processing of the mobile phone, thereby performing overall monitoring on the mobile phone. The processor 780 may include one or more processing units. Preferably, the processor 780 may integrate an application processor and a modem processor. The application processor mainly processes an operating system, a user interface, an application program, and the like. The modem processor mainly processes wireless communication. It may be understood that the foregoing modem may not be integrated into the processor 780, either.

The mobile phone further includes the power supply 790 (such as a battery) for supplying power to the components. Preferably, the power supply may be logically connected to the processor 780 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of this application, the processor 780 included in the terminal further has the following functions:

sending a domain name system DNS parsing request to a server, the DNS parsing request including a to-be-parsed domain name, and the DNS parsing request being used to obtain target Internet protocol IP information of the terminal by the server; and if the target IP information has a corresponding target user-defined line, receiving a first IP address corresponding to the to-be-parsed domain name sent by the server, the first IP address being determined by the server by obtaining a preset first parsing record based on the target user-defined line, and the first parsing record being used to instruct the terminal to establish a communications connection to a target server.

Correspondingly, the processor 780 further includes the following functions:

receiving a user-defined line adding request, where the user-defined line adding request carries a to-be-added parsing record; and sending the user-defined line adding request to the server, so that the server stores the to-be-added parsing record into a background database.

Correspondingly, after sending the domain name system DNS parsing request to the server, the processor 780 further includes the following function:

if the target IP information does not have the corresponding target user-defined line, receiving a second IP address corresponding to the to-be-parsed domain name sent by the server, where the second IP address is determined by the server after searching for a second parsing record corresponding to the IP information based on a preset priority, and the second parsing record is used to instruct the terminal to establish a communications connection to a second target server of the to-be-parsed domain name.

Figure 18:
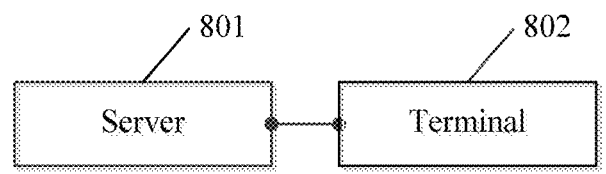
FIG. 18 is a schematic diagram of an embodiment of a system for parsing a service platform address according to an embodiment of this application.

Referring to FIG. 18, FIG. 18 is a system for parsing a service platform address according to an embodiment of this application. The system includes a server 801 and a terminal 802.

The server may be the server provided in the foregoing embodiments, and the terminal may be the terminal provided in the foregoing embodiments.

The terminal 802 may send a DNS parsing request to the server 801, where the DNS parsing request may include a to-be-parsed domain name.

The server 801 obtains target IP information of the terminal 802 based on the DNS parsing request.

If the target IP information has a corresponding target user-defined line, the server 801 obtains a preset first parsing record based on the target user-defined line, the first parsing record being used to instruct the terminal 802 to establish a communications connection to a first target server of the to-be-parsed domain name.

The server 801 sends, to the terminal 802, a first IP address corresponding to the to-be-parsed domain name based on the first parsing record preset by a user.

In this embodiment of this application, a system for parsing a service platform address in provided. A server first receives a DNS parsing request sent by a terminal. The DNS parsing request includes a to-be-parsed domain name. Then target IP information of the terminal is obtained based on the DNS parsing request. If the target IP information has a corresponding target user-defined line, a preset first parsing record including the target user-defined line can be obtained based on the target user-defined line. The first parsing record is used to instruct the terminal to establish a communications connection to a first target server of the to-be-parsed domain name. Finally, a first IP address corresponding to the to-be-parsed domain name is sent to the terminal based on the first parsing record preset by a user. A user-defined line is a line preset by a service developer based on requirements. A corresponding IP address range can be defined by using the user-defined line, so that a user terminal within the IP address range can obtain a specific IP address corresponding to an access domain name, to be specific, provide a service for a user within a more accurate range, thereby improving the flexibility and practicability of the solutions, and also facilitating selecting a grayscale user for service experience.

In addition, an embodiment of this application further provides a storage medium, the storage medium being configured to store program code, and the program code being configured to perform the method for parsing a service platform address.

An embodiment of this application further provides a computer program product including an instruction, the computer program product, when running on a server, causing the server to perform the method for parsing a service platform address.

It can be clearly learned by a person skilled in the art that, for the purpose of convenient and brief description, for a specific working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in the form of hardware, or may be implemented in the form of a software functional unit.

If the integrated unit is implemented in a form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (English full name: Read-Only Memory, English abbreviation: ROM), a random access memory (English full name: Random Access memory, English abbreviation: RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for parsing an address of a service platform performed at a server having one or more processors and memory storing a plurality of programs to be executed by the one or more processors, the method comprising:
   receiving, by the server, a domain name system DNS parsing request sent by a terminal, the DNS parsing request comprising a to-be-parsed domain name;
   obtaining, by the server, target Internet protocol (IP) information of the terminal based on the DNS parsing request;
   determining, by the server, an IP address range including the target Internet protocol (IP) information of the terminal;
   identifying, by the server, a target user-defined line corresponding to the IP address range within a background database, wherein the target user-defined line is preset to be associated with target servers via parsing records for providing predefined services to users of the service platform;
   obtaining, by the server, a preset first parsing record based on the target user-defined line, the first parsing record being used to instruct the terminal to establish a communications connection to a first target server of the to-be-parsed domain name; and
   sending, by the server to the terminal, a first IP address corresponding to the first target server of the to-be-parsed domain name based on the preset first parsing record.

2. The method according to claim 1, further comprising:
   after obtaining, by the server, target Internet protocol (IP) information of the terminal based on the DNS parsing request:
   determining, by the server, the target user-defined line corresponding to the target IP information based on a correspondence between an IP address range and a user-defined line and that is stored in a background database.

3. The method according to claim 2, wherein the operation of determining, by the server, the target user-defined line that is of the to-be-parsed domain name and that is corresponding to the target IP information further comprises:
   searching, by the server based on the correspondence between an IP address range and a user-defined line, in an IP address range corresponding to a user-defined line of the to-be-parsed domain name, for the target IP information; and
   determining, by the server, a user-defined line whose IP address range comprises the to-be-parsed domain name of the target IP information as the target user-defined line corresponding to the target IP information.

4. The method according to claim 1, wherein the operation of sending, by the server to the terminal, a first IP address corresponding to the to-be-parsed domain name based on the preset first parsing record further comprises:
   obtaining, by the server, the first IP address corresponding to the to-be-parsed domain name from the preset first parsing record; and
   sending, by the server to the terminal, the first IP address corresponding to the to-be-parsed domain name.

5. The method according to claim 1, further comprising:
   receiving, by the server, a user-defined line adding request, wherein the user-defined line adding request carries a to-be-added parsing record; and
   storing, by the server, the to-be-added parsing record in the user-defined line adding request into the background database.

6. The method according to claim 5, further comprising:
   after obtaining, by the server, target Internet protocol (IP) information of the terminal based on the DNS parsing request:
   in accordance with a determination that the target IP information does not have the corresponding target user-defined line, searching, by the server, for a second parsing record corresponding to the target IP information based on a preset priority, wherein the second parsing record is used to instruct the terminal to establish a communications connection to a second target server of the to-be-parsed domain name; and
   sending, by the server to the terminal, a second IP address corresponding to the to-be-parsed domain name based on the second parsing record.

7. A server, comprising:
   one or more processors;
   memory; and
   a plurality of programs stored in the memory that, when executed by the one or more processors, cause the server to perform a plurality of operations for parsing an address of a service platform including:
   receiving, by the server, a domain name system DNS parsing request sent by a terminal, the DNS parsing request comprising a to-be-parsed domain name;
   obtaining, by the server, target Internet protocol (IP) information of the terminal based on the DNS parsing request;
   determining, by the server, an IP address range including the target Internet protocol (IP) information of the terminal;
   identifying, by the server, a target user-defined line corresponding to the IP address range within a background database, wherein the target user-defined line is preset to be associated with target servers via parsing records for providing predefined services to users of the service platform;
   obtaining, by the server, a preset first parsing record based on the target user-defined line, the first parsing record being used to instruct the terminal to establish a communications connection to a first target server of the to-be-parsed domain name; and
   sending, by the server to the terminal, a first IP address corresponding to the to-be-parsed domain name based on the preset first parsing record.

8. The server according to claim 7, wherein the plurality of operations further comprise:
   after obtaining, by the server, target Internet protocol (IP) information of the terminal based on the DNS parsing request:
   determining, by the server, the target user-defined line corresponding to the target IP information based on a correspondence between an IP address range and a user-defined line and that is stored in a background database.

9. The server according to claim 8, wherein the operation of determining, by the server, the target user-defined line that is of the to-be-parsed domain name and that is corresponding to the target IP information further comprises:
   searching, by the server based on the correspondence between an IP address range and a user-defined line, in an IP address range corresponding to a user-defined line of the to-be-parsed domain name, for the target IP information; and
   determining, by the server, a user-defined line whose IP address range comprises the to-be-parsed domain name of the target IP information as the target user-defined line corresponding to the target IP information.

10. The server according to claim 7, wherein the operation of sending, by the server to the terminal, a first IP address corresponding to the to-be-parsed domain name based on the preset first parsing record further comprises:
obtaining, by the server, the first IP address corresponding to the to-be-parsed domain name from the preset first parsing record; and
sending, by the server to the terminal, the first IP address corresponding to the to-be-parsed domain name.

11. The server according to claim 7, wherein the plurality of operations further comprise:
receiving, by the server, a user-defined line adding request, wherein the user-defined line adding request carries a to-be-added parsing record; and
storing, by the server, the to-be-added parsing record in the user-defined line adding request into the background database.

12. The server according to claim 11, wherein the plurality of operations further comprise:
after obtaining, by the server, target Internet protocol (IP) information of the terminal based on the DNS parsing request:
in accordance with a determination that the target IP information does not have the corresponding target user-defined line, searching, by the server, for a second parsing record corresponding to the target IP information based on a preset priority, wherein the second parsing record is used to instruct the terminal to establish a communications connection to a second target server of the to-be-parsed domain name; and
sending, by the server to the terminal, a second IP address corresponding to the to-be-parsed domain name based on the second parsing record.

13. A non-transitory computer readable storage medium storing a plurality of instructions in connection with a server having one or more processors, wherein the plurality of instructions, when executed by the one or more processors, cause the server to perform a plurality of operations for parsing an address of a service platform including:
receiving, by the server, a domain name system DNS parsing request sent by a terminal, the DNS parsing request comprising a to-be-parsed domain name;
obtaining, by the server, target Internet protocol (IP) information of the terminal based on the DNS parsing request;
determining, by the server, an IP address range including the target Internet protocol (IP) information of the terminal;
identifying, by the server, a target user-defined line corresponding to the IP address range within a background database, wherein the target user-defined line is preset to be associated with target servers via parsing records for providing predefined services to users of the service platform;
obtaining, by the server, a preset first parsing record based on the target user-defined line, the first parsing record being used to instruct the terminal to establish a communications connection to a first target server of the to-be-parsed domain name; and
sending, by the server to the terminal, a first IP address corresponding to the to-be-parsed domain name based on the preset first parsing record.

14. The non-transitory computer readable storage medium according to claim 13, wherein the plurality of operations further comprise:
after obtaining, by the server, target Internet protocol (IP) information of the terminal based on the DNS parsing request:
determining, by the server, the target user-defined line corresponding to the target IP information based on a correspondence between an IP address range and a user-defined line and that is stored in a background database.

15. The non-transitory computer readable storage medium according to claim 14, wherein the operation of determining, by the server, the target user-defined line that is of the to-be-parsed domain name and that is corresponding to the target IP information further comprises:
searching, by the server based on the correspondence between an IP address range and a user-defined line, in an IP address range corresponding to a user-defined line of the to-be-parsed domain name, for the target IP information; and
determining, by the server, a user-defined line whose IP address range comprises the to-be-parsed domain name of the target IP information as the target user-defined line corresponding to the target IP information.

16. The non-transitory computer readable storage medium according to claim 13, wherein the operation of sending, by the server to the terminal, a first IP address corresponding to the to-be-parsed domain name based on the preset first parsing record further comprises:
obtaining, by the server, the first IP address corresponding to the to-be-parsed domain name from the preset first parsing record; and
sending, by the server to the terminal, the first IP address corresponding to the to-be-parsed domain name.

17. The non-transitory computer readable storage medium according to claim 13, wherein the plurality of operations further comprise:
receiving, by the server, a user-defined line adding request, wherein the user-defined line adding request carries a to-be-added parsing record; and
storing, by the server, the to-be-added parsing record in the user-defined line adding request into the background database.

18. The non-transitory computer readable storage medium according to claim 17, wherein the plurality of operations further comprise:
after obtaining, by the server, target Internet protocol (IP) information of the terminal based on the DNS parsing request:
in accordance with a determination that the target IP information does not have the corresponding target user-defined line, searching, by the server, for a second parsing record corresponding to the target IP information based on a preset priority, wherein the second parsing record is used to instruct the terminal to establish a communications connection to a second target server of the to-be-parsed domain name; and
sending, by the server to the terminal, a second IP address corresponding to the to-be-parsed domain name based on the second parsing record.

* * * * *